United States Patent [19]

Birkmeyer et al.

[11] Patent Number: 4,517,322

[45] Date of Patent: May 14, 1985

[54] ACRYLATED ALKYD AND POLYESTER RESINS

[75] Inventors: William J. Birkmeyer, Oakmont; Ralph C. Gray, Allison Park; Rostyslaw Dowbenko; David C. Kapp, both of Gibsonia; Ellor J. VanBuskirk; Rudolf Maska, both of Pittsburgh, all of Pa.

[73] Assignee: PPG Industries, Inc., Pittsburgh, Pa.

[21] Appl. No.: 534,916

[22] Filed: Sep. 22, 1983

[51] Int. Cl.$^3$ .................. C09D 3/66; C09D 3/68
[52] U.S. Cl. ................... 523/501; 428/458; 523/503; 523/522; 525/7; 525/7.1; 525/7.3
[58] Field of Search ............ 523/500, 501, 503, 522; 525/7, 7.1, 7.3; 428/458

[56] References Cited

U.S. PATENT DOCUMENTS

| | | | |
|---|---|---|---|
| 2,590,653 | 3/1952 | Schmutzler | 525/7 |
| 2,647,092 | 7/1953 | Meeske et al. | 525/7.1 |
| 2,939,854 | 6/1960 | Christenson | 525/7.1 |
| 3,287,293 | 11/1966 | Dalibor | 525/7.3 |
| 3,401,130 | 9/1968 | Korf | 525/7 |
| 3,748,293 | 7/1973 | Torelli | 525/7.3 |
| 4,094,836 | 6/1978 | Yasui et al. | 525/7.3 |
| 4,115,336 | 9/1978 | Crouzet | 523/501 |
| 4,116,903 | 9/1978 | Lietz et al. | 525/7.3 |
| 4,133,786 | 1/1979 | Harris et al. | 523/501 |
| 4,420,575 | 12/1983 | Rapaport et al. | 523/501 |

FOREIGN PATENT DOCUMENTS

| | | | |
|---|---|---|---|
| 601886 | 7/1960 | Canada | 523/501 |
| 51-7577 | 3/1976 | Japan | 523/522 |
| 55-86845 | 7/1980 | Japan | 523/500 |
| 1011050 | 11/1965 | United Kingdom | 525/7.1 |

OTHER PUBLICATIONS

AMOCO Technical Bulletin TMA-124a.

*Primary Examiner*—Ronald W. Griffin
*Attorney, Agent, or Firm*—Barbara J. Park; H. Lawrence Jones

[57] ABSTRACT

Non-gelled resins formed by reacting an ethylenically unsaturated polyester with ethylenically unsaturated monomers which include an ethylenically unsaturated acid are provided which are useful in coatings having better stability.

12 Claims, No Drawings

ACRYLATED ALKYD AND POLYESTER RESINS

BACKGROUND OF THE INVENTION

1. Field of the Invention

This invention relates to a non-gelled resin formed by reacting an ethylenically unsaturated polyester with ethylenically unsaturated monomers which include an ethylenically unsaturated acid, the resin being dispersed with base in aqueous medium. More particularly, the ethylenic unsaturation in the polyester is provided in the backbone thereof or pendant thereto when e.g. maleic anhydride or fumaric acid is used and pendant thereto when e.g. itaconic acid is used and is a site for grafting during the polymerization. The use of an ethylenically unsaturated acid during polymerization provides for increased solubility of the resin in water.

2. Description of the Prior Art

Some of the problems the industry has faced have been related to improving the properties of polymer stability and flow. It is an object of this invention to overcome these problems.

SUMMARY OF THE INVENTION

It has now been discovered that a certain resin is useful in resolving problems of the prior art. The resin is a non-gelled resin formed by reacting an ethylenically unsaturated polyester with ethylenically unsaturated monomers which include an ethylenically unsaturated acid, the resin being dispersed with base in aqueous medium.

The resins, when crosslinked with e.g. melamine, are useful for industrial coatings having better stability and flow than formulations containing blends of alkyds and/or polyester resins with acrylic polymers.

DESCRIPTION OF THE PREFERRED EMBODIMENTS

By the term non-gelled is meant that the resin is soluble or dispersible in water containing base.

The property of stability refers to the ability of the varnish to remain stable in water. Flow is related to wetting and refers to the ability of the coating to cover the surface of the substrate.

The ethylenically unsaturated polyester of use in the non-gelled resin of the invention is an ethylenically unsaturated polyester resin made by a polyester condensation reaction of e.g. polycarboxylic acids, preferably dicarboxylic acids, with polyhydroxy alcohols, preferably dihydroxy alcohols, according to known methods.

The ethylenically unsaturated polyester resin of the invention comprises, as an essential ingredient, an ethylenically unsaturated component which maintains its ethylenic unsaturation during the polyester condensation reaction. The ethylenically unsaturated component is defined to contain a double bond between two carbon atoms each of which carbon atoms is otherwise attached only by single bonds to other carbon atoms or hydrogens; and also to contain two carboxylic acid moieties or their equivalents, i.e. anhydrides, where they exist (existent anhydrides). The other carbon atoms may be attached to oxygen in a double bond, e.g. in the carboxylic acid moieties, but other double bonds, e.g. conjugated unsaturation are not included in the definition, nor are aromatic bonds. Useful ethylenically unsaturated components are ethylenically unsaturated dicarboxylic acids or their existent anhydrides, e.g. fumaric acid, maleic acid, mesaconic acid, citraconic acid, and itaconic acid. Preferably used is maleic anhydride.

Other components of the ethylenically unsaturated polyester resin include monocarboxylic acids, polycarboxylic acids e.g. dicarboxylic acids, tri and higher polycarboxylic acids, polyhydric alcohols e.g. dihydroxy alcohols, tri and higher polyhydric alcohols; and polyfunctional-group compounds. Of these other components, only the difunctional acid and difunctional alcohol are essential the others being optional, but in many instances, preferred. Useful dicarboxylic acids include phthalic, isophthalic, terephthalic, tetrahydrophthalic, hexahydrophthalic, adipic, azelaic, sebacic, glutaric, chlorendic, tetrachlorophthalic, malonic, suberic, 2 methyl succinic, 3,3-diethyl glutaric and 2,2-dimethyl succinic acid. Existent anhydrides of these acids can also be employed and are encompassed by the term "dicarboxylic acids." Dihydroxy alcohols include alkane diols, i.e. alkylene glycols having 2 to 6 carbon atoms in the alkylene group, such as ethylene, propylene, butylene glycol, neopentyl glycol, 2,2,4-trimethyl-1,3-pentane diol and trimethylene glycol; arylene containing diols such as bisphenol A; alicyclic cycloparaffins such as cyclohexanedimethanol and hydrogenated bisphenol A; polyether glycols such as poly(oxytetramethylene) glycol having molecular weight range of from 106 up to 10,000 and caprolactone-diol reaction products. Monocarboxylic acids such as benzoic and hexanoic acid can be used, provided the average functionality of the ethylenically unsaturated polyester resin is above about 2.0. Tricarboxylic acids and higher polycarboxylic acids, such as trimellitic acid and their existent anhydrides can be used as well as tri and higher polyhydric alcohols such as glycerol, trimethylolethane, trimethylolpropane, pentaerythritol, sorbitol and mannitol. Polyfunctional-group compounds include those compounds having more than one functional group, e.g. carboxyl and hydroxyl; preferably used is dimethylolpropionic acid. Also useful as an other component are oxides from which the plyol may be derived, e.g. phenyl glycidyl ether, and the diglycidyl ether of bisphenol A.

The ethylenically unsaturated polyester resins of the invention also meet the definition of polyol in that the resins have more than one hydroxyl group and are prepared using an excess of the alcohols described herein.

A preferred embodiment of the invention comprises ethylenically unsaturated polyester resins which are alkyd resins. Therefore in this embodiment the polyester resin is made from the ethylenically unsaturated component and the above-mentioned other components of the ethylenically unsaturated polyester resin in the presence of and by reaction with a drying, semi-drying or non-drying oil or fatty acid in proportions depending upon the properties desired. The oils or fatty acids are reacted into the resin molecule by esterification during production and become an integral part of the polymer. The oil or fatty acids may be saturated or contain unsaturation, including conjugated unsaturation. Fully saturated oils or fatty acids promote a plasticizing effect whereas unsaturation promotes crosslinking and rapid drying with oxidation to give a more tough and durable alkyd resin. Suitable oils or fatty acids include coconut, fish, linseed, tung, castor, cottonseed, safflower, soybean and tall oil.

A catalyst may be employed in the condensation reaction of preparing the ethylenically unsaturated polyester of use in the non-gelled resin of the invention. A preferred example is dibutyltin oxide.

The ethylenically unsaturated monomers comprise as an essential ingredient the ethylenically unsaturated acid which is an ethylenically unsaturated carboxylic acid. The preferred ethylenically unsaturated carboxylic acids are acrylic acid or methacrylic acid, but other suitable carboxylic acids such as itaconic acid, crotonic acid, maleic acid and half esters of maleic and fumaric acids wherein one carboxyl group is esterified with an alcohol, said alcohol also not precluding the desired utilization of the product can be used. Such half esters are e.g. butyl hydrogen maleate and ethyl hydrogen fumarate. Preferred is acrylic acid.

The ethylenically unsaturated monomers are a composition containing comonomers e.g. hardening and flexibilizing monomers. The hardening monomer is generally styrene with other examples being vinyl toluene and alkyl methacrylates having from 1 to 4 carbon atoms in the alkyl group. The flexibilizing monomer is one or more alkyl or substituted alkyl esters of acrylic acid or methacrylic acid, the alkyl group of the acrylic ester having 1 to 13 carbon atoms and the alkyl group having 5 to 16 carbon atoms in the case of methacrylic esters. Examples are ethyl acrylate, butyl acrylate, 2-ethylhexyl acrylate, 2-ethylhexyl methacrylate, decyl methacrylate and lauryl methacrylate.

A polymerization catalyst is employed in the preparation of the non-gelled resin of the invention. Any free catalyst can be used but t-butyl perbenzoate is preferred.

The non-gelled resin of the invention is dispersed with base in aqueous medium. Typical bases are the alkali metal and the alkaline earth metal hydroxides. Preferably used is ammonia and more preferably used are the amines, such as ethanolamine and dimethyl ethanolamine. Between 50 and 150 percent of the acidity is neutralized with the base.

The non-gelled resin of the invention is formed by reacting from about 90 to about 30, preferably about 80 to about 35 percent by weight relative to the total weight of the non-gelled resin, of the ethylenically unsaturated polyester with from about 10 to about 70, preferably about 20 to about 65 percent by weight, relative to the total weight of the non-gelled resin, of the ethylenically unsaturated monomers. The ethylenically unsaturated polyester contains from about 2 to about 10, preferably from about 4 to about 6 percent by weight, relative to the weight of the unsaturated polyester, of the ethylenically unsaturated component. The ethylenically unsaturated monomers contain from about 2 to about 20, preferably about 5 to about 15 percent by weight, relative to the weight of the total resins solids, of the ethylenically unsaturated acid.

The non-gelled resin of the invention can be used in a mixture with components to cure it e.g. aminoplast resins, and conventional additives to make a coating.

Still other components include additives known in the art which are added to improve certain properties. Useful other components are waxes, solvents and catalysts.

The coatings are prepared e.g. from the non-gelled resin of the invention, polyols, crosslinkers and conventional additives. Useful crosslinkers include aminoplast resins such as methyl, ethyl and ethers butyl of melamine formaldehyde or urea formaldehyde reaction products.

The following examples will further illustrate the various aspects of the invention. Where not otherwise specified throughout this specification and claims, temperatures are in degrees centigrade and parts, percentages and proportions are by weight.

EXAMPLE I - POLYESTER

A. The following materials were charged to a five liter ground glass flask under a nitrogen blanket:

| Materials | Parts |
| --- | --- |
| Deionized water | 154 |
| NPG (neopentyl glycol) | 1383 |
| DMPA (dimethylol propionic acid) | 180 |
| Adipic acid | 766 |
| Maleic anhydride | 170 |
| Benzoic acid | 224 |
| IPA - 99 (isophthalic acid) | 677 |
| DBTO (dibutyl tin oxide) | (3) |

The reaction vessel was heated to 149° C. and held at this temperature for one-half hour, 193° C. for one-half hour and finally about 210° C. until the acid number reached 29 to 30. The condensation product had an acid number of 27.8, % total solids 96.6 and a hydroxyl number of 108.0. During the condensation reaction, 554 parts of water were removed.

B. To 840 parts of the polyester condensation product of Example I-A were added the following materials:

| Materials | Parts |
| --- | --- |
| Acrylic acid | 60 |
| Styrene | 108 |
| Ethyl Acrylate | 192 |

The polymerization procedure followed was:

(a) The resin and 140 parts of butyl cellosolve were charged to a 3 liter flask and heated to 200° F.

(b) the above amounts of acrylic acid, styrene and ethyl acrylate were then mixed and added to the flask.

(c) a rinse of 30 parts of butyl cellosolve was then added to the flask.

(d) 21.6 parts of mercaptoethanol was then added.

(e) a rinse of 30 parts butyl cellosolve was then added.

(f) 20 parts butyl cellosolve and 7.2 parts t-butyl perbenzoate were then mixed and added to the flask.

(g) a rinse of 30 parts butyl cellosolve was then added.

The reaction mixture was then heated to 93° C. and the heat reduced during the exotherm was controlled at a maximum 121° C.

The reaction mixture was held at 116° C. to 122° C. for one hour and then (h) an additional 150 parts butyl cellosolve and 7.2 parts t-butyl perbenzoate were mixed and added to the flask dropwise over a period of 3 hours holding the temperature between 240° F. and 250° F.

The reaction mixture was then held for two hours at 116° C. to 122° C. after which the styrene acrylic adduct of a polyester product was allowed to cool. The product had an acid number of 40.8, color 1, viscosity Z5, weight per gallon 9.01 pounds per gallon and a solids content of 75.0 percent. The product was then dispersed with dimethyl ethanolamine in water using 3.3 parts of dimethyl ethanolamine per 50 parts resin having 75 percent total solids and per 40.5 parts deionized water to give a clear solution having 40 percent total solids and a pH of 8.0.

EXAMPLE II - Oil Modified Polyester

Following the general procedure of Example I, the following materials were reacted to produce a resin intermediate of the invention having a 82.2% solids content, viscosity-L, color 5-6, weight/gallon of 8.38 and acid value of 26.2.

| A. Materials | Parts |
|---|---|
| NPG | 577.0 |
| DMPA | 195.0 |
| Maleic anhydride | 184.0 |
| Benzoic acid | 243.0 |
| IPA-99 | 341.0 |
| Tall oil fatty acid | 1626.0 |
| Trimethylol propane (TMP) | 351.0 |
| DBTO | 1.7 |
| Butyl cellosolve | 554.0 |

Continuing the general procedure of Example I the following materials were reacted to produce a modified resin of the invention:

| B. Materials | Parts |
|---|---|
| Intermediate resin A | 2372 |
| Acrylic acid | 288 |
| Butyl acrylate | 576 |
| Butyl cellosolve | 489 |
| Isopropyl alcohol | 115 |
| t-butyl perbenzoate | 60.3 |

The modified resin had a solids content of 74.9 percent, viscosity of 1, color of 3, weight per gallon of 8.50 and an acid value of 63.9.

EXAMPLE III - ALKYD

A. Following the general procedure of Example IA a base alkyd was prepared from the following materials:

| Materials | Parts |
|---|---|
| Tall oil fatty acids | 4000 |
| 2,2,4-trimethyl-1,3-pentane diol | 1794 |
| TMP | 820 |
| DMPA | 480 |
| Benzoic acid | 479 |
| Maleic anhydride | 452 |
| IPA - 99 | 594 |
| DBTO | 8 |

During the condensation reaction, 540 parts of water and 65 parts organics were removed. The base alkyd had an acid number of 32.8, percent total solids of 94.9, hydroxyl number of 99.7 and a viscosity of Z+.

B. To 944 parts of the base alkyd of Example III A were added the following materials:

| Materials | Parts |
|---|---|
| Methyl methacrylate | 404 |
| Acrylic acid | 298 |
| Butyl acrylate | 850 |
| Styrene | 204 |

The polymerization procedure followed was:

(a) The resin, 984 parts of butyl cellosolve and 108 parts of isopropyl alcohol were charged to a 5 liter flask with nitrogen sparge and heated to a range of about 127° C. to about 132° C.

(b) The above amounts of ethylenically unsaturated monomers, methyl methacrylate, acrylic acid, butyl acrylate and styrene were then added along with 52.8 parts t-butylperbenzoate and 200 parts of butyl cellosolve simultaneously dropwise over a period of 2 hours.

(c) A rinse of 40 parts butyl cellosolve was added through the system feeding the ethylenically unsaturated monomers and a rinse of 40 parts butyl cellosolve was added through the system feeding t-butylperbenzoate and butyl cellosolve.

(d) The reactants were held at a temperature range of 127° C. to 132° C. for one hour.

(e) 35 parts t-butylperbenzoate and 40 parts butyl cellosolve are added and the reactants held at a temperature range of 127° C. to 132° C. for one hour.

(f) 35 parts t-butylperbenzoate and 40 parts butyl cellosolve are added and the reactants held at a temperature range of 127° C. to 132° C. for two hours.

The product had an acid number of 58.9, percent total solids of 64.9, color of 1, weight per gallon of 8.47 pounds per gallon and viscosity of Z-3-. The product was then dispersed with dimethyl ethanolamine in water.

What is claimed is:

1. A non-gelled resin formed by reacting:
   (a) an ethylenically unsaturated polyester having an ethylenically unsaturated component which contains two carboxylic acid moieties with
   (b) ethylenically unsaturated monomers which include an ethylenically unsaturated acid, said resin being dispersed with base in aqueous medium.

2. The resin of claim 1 wherein the ethylenically unsaturated polyester is an alkyd resin made from components of the ethylenically unsaturated polyester in the presence of and by reaction with a drying, semi-drying, non-drying oil or fatty acid.

3. The resin of claim 2 wherein the fatty acid is tall oil.

4. The resin of claim 2 wherein the components of the ethylenically unsaturated polyester comprise an ethylenically unsaturated component, a polycarboxylic acid and a polyhydroxy alcohol.

5. The resin of claim 4 wherein the ethylenically unsaturated component is maleic anhydride.

6. The resin of claim 4 which additionally comprises, as a component of the ethylenically unsaturated polyester, a polyfunctional-group compound.

7. The resin of claim 6 wherein the polyfunctional-group compound is dimethylolpropionic acid.

8. The resin of claim 1 wherein the ethylenically unsaturated monomers comprise an ethylenically unsaturated caboxylic acid and a material selected from the group consisting of alkyl acrylates, alkyl methacrylates having 1 to 6 carbon atoms in the alkyl group, vinyl aromatic monomer and mixtures thereof.

9. The resin of claim 8 wherein the ethylenically unsaturated monomers comprise acrylic acid, ethyl acrylate and styrene.

10. The resin of claim 8 wherein the ethylenically unsaturated monomers comprise acrylic acid and butyl acrylate.

11. The resin of claim 1 which is dispersed with an amine.

12. The resin of claim 11 wherein the amine is dimethylethanolamine.

* * * * *